(12) United States Patent
Mersmann

(10) Patent No.: US 11,554,815 B2
(45) Date of Patent: Jan. 17, 2023

(54) FIBER-REINFORCED VEHICLE BODY

(71) Applicant: Bayerische Motoren Werke Aktiengesellschaft, Munich (DE)

(72) Inventor: Christoph Mersmann, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/769,622

(22) PCT Filed: Sep. 26, 2018

(86) PCT No.: PCT/EP2018/076050
§ 371 (c)(1),
(2) Date: Jun. 4, 2020

(87) PCT Pub. No.: WO2019/115041
PCT Pub. Date: Jun. 20, 2019

(65) Prior Publication Data
US 2021/0163079 A1    Jun. 3, 2021

(30) Foreign Application Priority Data
Dec. 13, 2017   (DE) ................. 10 2017 222 652.8

(51) Int. Cl.
| | |
|---|---|
| *B62D 29/00* | (2006.01) |
| *B29C 70/02* | (2006.01) |
| *B62D 29/04* | (2006.01) |
| *B62D 65/00* | (2006.01) |
| *B29L 31/30* | (2006.01) |

(Continued)

(52) U.S. Cl.
CPC .......... *B62D 29/005* (2013.01); *B29C 70/028* (2013.01); *B62D 29/043* (2013.01);
(Continued)

(58) Field of Classification Search
CPC ...... B62D 25/04; B62D 25/02; B62D 25/025; B62D 29/001; B62D 29/004;
(Continued)

(56) References Cited

U.S. PATENT DOCUMENTS

2008/0156425 A1   7/2008  Howe et al.
2013/0071574 A1   3/2013  Allison et al.
(Continued)

FOREIGN PATENT DOCUMENTS

DE          102 38 204 A1    3/2004
DE     10 2006 058 602 A1    6/2008
(Continued)

OTHER PUBLICATIONS

Translation of DE10238204, Document Dated Mar. 25, 2004.*
(Continued)

*Primary Examiner* — Dennis H Pedder
(74) *Attorney, Agent, or Firm* — Crowell & Moring LLP

(57) ABSTRACT

A method produces a fiber-reinforced body component for a motor vehicle. The body component has at least one opening, in particular one door opening or one window opening. The method includes at least the following steps: providing the body component; applying a reinforcing element made of fiber composite material having reinforcing fibers embedded in a matrix, in order to stiffen the body component, the matrix being in an uncured state, and the reinforcing element being applied to an opening frame of the opening, which opening frame is formed by the body component.

17 Claims, 2 Drawing Sheets

(51) Int. Cl.
*B62D 25/02* (2006.01)
*B62D 25/04* (2006.01)

(52) U.S. Cl.
CPC ...... *B62D 65/00* (2013.01); *B29L 2031/3002* (2013.01); *B62D 25/025* (2013.01); *B62D 25/04* (2013.01)

(58) Field of Classification Search
CPC ..... B62D 29/005; B29C 70/08; B29C 70/028; B29C 70/021; B29C 70/86; B29C 70/305
USPC .... 296/203.01, 203.02, 203.03, 203.04, 209, 296/193.06
See application file for complete search history.

(56) References Cited

U.S. PATENT DOCUMENTS

| | | | |
|---|---|---|---|
| 2013/0193713 A1* | 8/2013 | Reese | B29C 45/1418 296/181.2 |
| 2015/0376353 A1* | 12/2015 | Takebe | B29C 70/021 428/161 |

FOREIGN PATENT DOCUMENTS

| | | |
|---|---|---|
| DE | 10 2007 038 087 A1 | 2/2009 |
| DE | 10 2013 019 474 A1 | 5/2014 |
| DE | 10 2017 219 980 A1 | 5/2019 |
| EP | 1 714 855 A2 | 10/2006 |
| WO | WO-2004026666 A1 * | 4/2004 ........... B62D 29/001 |
| WO | WO 2011/124308 A1 | 10/2011 |

OTHER PUBLICATIONS

International Search Report (PCT/ISA/210) issued in PCT Application No. PCT/EP2018/076050 dated Dec. 13, 2018 with English translation (six (6) pages).

German-language Written Opinion (PCT/ISA/237) issued in PCT Application No. PCT/EP2018/076050 dated Dec. 13, 2018 (seven (7) pages).

German-language Search Report issued in German Application No. 102017222652.8 dated Jul. 26, 2018 with partial English translation (13 pages).

Starke J., "Carbon Composites in Automotive Structural Applications", EuCIA: Composites and Sustainability, Mar. 16, 2016, XP055530341, retrieved from http://www.eucia.eu/userfiles/files/Starke-Eucia%202016-V4.Druck%20b.pdf (44 pages).

German Search Report issued in German application No. 10 2017 222 652.8 dated Jul. 26, 2018, with partial English translation appended (Nine (9) pages).

Chinese Board Decision Issued in Chinese application No. 201880076235.5 dated Jul. 5, 2022, with English translation (Two (2) pages).

* cited by examiner

FIBER-REINFORCED VEHICLE BODY

BACKGROUND AND SUMMARY OF THE INVENTION

The invention relates to a method for producing a fiber reinforced vehicle body component for a motor vehicle, and to a corresponding vehicle body component.

In the case of the production of motor vehicles, hybrid components are being used increasingly, in particular for vehicle body and chassis components, in order to reduce component weight and therefore the overall vehicle weight. In this way, fuel consumption can be lowered, and the driving dynamics and the vehicle efficiency can be improved.

For production purposes, a metallic main body is usually reinforced at least in regions with the aid of an additional component made from fiber composite material. Hybrid components of this type are distinguished by a light structure, the crash properties and stiffness of which can be improved considerably in the case of an optimum design in comparison with purely metallic components. A connection between the metallic main body and the fiber composite component is achieved, for example, by way of adhesive bonding with separate adhesive or riveting. As an alternative, direct, positively locking overmolding of the plastic is known.

A hybrid component in the form of a B-pillar of a motor vehicle and its production method are known, for example, from DE 10 2006 058 602 A1. Here, a stack with preimpregnated fiber materials, what are known as prepregs, is first of all produced, which stack is subsequently cut to size in accordance with a desired geometry. Subsequently, the stack which is cut to size is preformed to form a three-dimensional shape. The preformed stack can subsequently be pressed with a metallic main body. The connection between the two materials is realized with the aid of an adhesive.

Methods of this type therefore require a comprehensive preparation, for example by way of stacking processes and cutting to size, and exact preforming processes for producing the preformed reinforcing component with sufficiently low tolerances. Only so can subsequent joining together and adhesive bonding to the metallic component be carried out in a reliable and reproducible manner in the subsequently necessary joining step. The production process usually results in a uniform component thickness for the reinforcing component, with the result that component regions which are loaded to a lesser extent and to a greater extent are reinforced to the same extent. Together with waste which is incurred, this leads to a high material outlay of expensive fiber material.

A further method for producing a fiber reinforced component group is described in the previously unpublished patent application DE 10 2017 219 980.6 from the Applicant.

It is therefore an object of the invention to provide a vehicle body for a vehicle, which vehicle body has as high a rigidity as possible; its production is nevertheless to take place as simply and inexpensively as possible. In particular, a method sequence for the production is to be simplified, and a use of expensive fiber material and cost-intensive tooling is to be kept as low as possible.

This object is achieved by way of a method and by way of a vehicle body component according to the claimed invention.

Accordingly, a method for producing a fiber reinforced vehicle body component for a motor vehicle is provided, the vehicle body component having at least one opening, in particular a door opening or a window opening, with at least the following steps:
 a. providing of the vehicle body component,
 b. applying of a reinforcing element made from fiber composite material with reinforcing fibers which are embedded in a matrix for stiffening the vehicle body component, the matrix having a non-cured state, and the reinforcing element being applied on an opening frame of the opening, which opening frame is formed by the vehicle body component.

The vehicle body component can be produced in one piece, for example, or can be assembled from a plurality of individual components which are connected to one another fixedly, in particular rigidly. It goes without saying that the vehicle body component can form a vehicle body of the vehicle on its own or together with one or more further vehicle body components. For example, the vehicle is configured as a passenger motor vehicle or a truck.

In accordance with one embodiment, the vehicle body component is not coated, and accordingly does not have any additional coating which is applied to a structure material of the vehicle body component. Accordingly, the applying of the reinforcing element takes place directly on an opening frame of the opening, which opening frame is formed by the uncoated vehicle body component.

Furthermore, the method can comprise the following additional step:
 coating of a surface of the vehicle body component with a corrosion protection layer.

Here, the vehicle body component is coated with the corrosion layer, in order to avoid surface corrosion.

The additional step takes place either temporally following the described applying of the reinforcing element to the uncoated vehicle body component.

As an alternative, in accordance with another embodiment, the additional step of coating of the surface of the vehicle body component with a corrosion protection layer can take place following the step of providing of the vehicle body component and before the applying of the reinforcing element. Accordingly, the reinforcing element is applied on an opening frame of the opening, which opening frame is formed by the coated vehicle body component. Therefore, in this case, the reinforcing element is applied to the vehicle body component which is coated with the corrosion protection layer. In other words, this means that the reinforcing element is laid on to the coated surface of the vehicle body component.

In every case, it is considered self-evident that more than only one reinforcing element can be applied in this way to the vehicle body component, or the reinforcing element can consist of a plurality of part elements which are arranged next to one another and/or above one another.

In each of the described embodiments, the applying of the reinforcing element takes place in a non-cured, that is to say liquid or viscous, state of the matrix. Here, the matrix can either not yet be cured or, starting from a cured state or a partially cured state, can have been transferred back into the non-cured state. Within the context of this description, moreover, the non-cured state is also to be understood to mean (but in no way in a restrictive manner) a re-softened state or a melt-flowable state, or else a state between the two states.

Both thermosetting and thermoplastic materials are suitable as matrix material. This material is in the non-cured, viscous state for the step of applying of the reinforcing element. In the case of a thermoplastic matrix, the non-cured state is also called the non-consolidated state. The described curing of the matrix and therefore of the reinforcing element takes place only in one of the following steps. The curing of the matrix can be cured in each of the described embodiments, for example, by way of curing at room temperature or at an elevated temperature, for example in an oven. In the case of a thermoplastic matrix, the curing is also called consolidating.

In any case, the fiber composite material of the reinforcing element comprises a fiber/plastic composite with reinforcing fibers which are embedded in a matrix, the matrix being present in the non-cured state, that is to say in the liquid or viscous state. Here, the reinforcing fibers which are embedded in the matrix are surrounded either partially or completely by way of the matrix. The curing of the matrix and therefore of the reinforcing element takes place only in a later step, as will be described in detail in the following text.

In any case, the reinforcing element is applied on the opening frame. The opening frame is therefore a section of the vehicle body component and encloses the opening which is provided in the vehicle body component. The opening frame can be, for example, a door frame or a window frame.

For example, the step of applying of the reinforcing element can comprise applying of the reinforcing element to the opening frame merely in sections or such that it runs around the opening. Accordingly, the reinforcing element is either arranged merely locally in a section of the opening frame, or is arranged so as to run around the opening along the opening frame. In every case, the reinforcing element represents a reinforcing or stiffening and at the same time load-bearing layer which can be integrated in a discreet and space-saving manner on the vehicle body component. In terms of the mode of action, the reinforcing element, in particular in the case of a peripheral arrangement, is inspired by the mode of action of a "rollover cage" from the field of motor sports.

In the case of a peripheral arrangement, the reinforcing element forms a peripheral structure which is inherently closed, represents a particularly effective reinforcement for the vehicle body component, and makes a yet more considerably increased overall rigidity of the vehicle body component possible.

For example, the step of applying can comprise applying of the reinforcing element to an inner side of the opening frame, which inner side faces the opening, and/or to an end face of the opening frame, which end face is on the outer side and/or inner side of the vehicle. In particular, a "case" of the opening frame is to be understood as the inner side of the opening frame, that is to say a door case in the case of a door frame or a window case in the case of a window frame. In every case, this is that surface of the opening frame which faces the opening and borders or frames it accordingly.

The end faces, that is to say the end face on the outer side of the vehicle and the end face on the inner side of the vehicle, are formed correspondingly by way of the end faces which adjoin the inner side in respect of the corresponding sides. On account of geometric configurations, both the inner side and the end sides can be of multiple-stepped configuration.

In comparison with conventional local reinforcements of individual components which act merely locally in a component-reinforcing manner and are accordingly restricted to the respective, individual component, stiffening of the overall vehicle body component can be brought about in this way, moreover, in addition to the local reinforcement. Accordingly, the vehicle body component is correspondingly suitable for higher loads, or lower load requirements can be made of the vehicle body component, as a result of which a component weight can be reduced accordingly.

In the case of the described method, forming or reforming of the reinforcing element (that is to say, the production and shaping of the reinforcing element) therefore takes place first of all by way of the applying to the vehicle body component. An upstream manufacturing process for preforming can accordingly be dispensed with. Expensive preforming tools can accordingly be dispensed with, and a joining process can be simplified considerably.

On account of the local reinforcement and stiffening of the vehicle body component, a respective thickness of the individual components can in return be reduced and designed according to requirements. Moreover, in the case of the applying of the reinforcing element, a local thickness of the reinforcing element can optionally be adapted, by more or fewer layers of the fiber composite material being applied locally depending on the requirements. This means that the reinforcing element can have a varying thickness along its extent on account of a locally different number of layers. This makes an improved lightweight construction with an increased strength and stiffness and the savings of material possible in the case of the individual components and the reinforcing element.

For example, the optional step of coating of a surface of the vehicle body component with the corrosion protective layer can comprise coating of the surface with a cathodic dip coating (CDC). Here, in a state in which it has not yet been coated, the vehicle body component can be dipped into a corresponding dip tank. This is suitable, in particular, for relatively large vehicle body components including a vehicle body component which is configured as an entire vehicle body.

If the step of coating is carried out before the applying of the reinforcing element, it is thus possible that the step of coating comprises at least partial or complete curing of the corrosion protection layer which likewise takes place before the step of applying of the reinforcing element. This means that, after the step of coating, the corrosion protection layer is first of all dried or cured merely partially or completely. This can take place, for example, under the action of heat, in particular by means of corresponding heat lamps or in a suitable oven. The reinforcing element is applied and is itself cured in a later curing step only after the partial or complete curing of the corrosion protection layer. For example, the reinforcing element can be applied to the vehicle body component which has already been cooled or is still warm after the curing.

As an alternative or in addition to this, following the step of applying of the reinforcing element, which step is carried out after the coating of the surface of the vehicle body component with the corrosion protection layer, a step of common curing of the corrosion protection layer and of the reinforcing element can take place. This means that the corrosion layer is not yet cured or is not yet cured completely during the applying of the reinforcing element. In these cases, the corrosion protection layer which is not yet cured (partially) or is not yet cured completely can be cured together with the applied reinforcing element which is likewise not yet cured.

The step of applying of the reinforcing element, which step is described in the preceding text in respect of the respective embodiments, can preferably comprise direct laying of the reinforcing element (in a manner which is dependent on the respective embodiment) onto the uncoated vehicle body component or the corrosion protection layer which has previously been applied to the vehicle body component. This means that the reinforcing element is either laid directly on the vehicle body component or directly on the corrosion protection layer of the vehicle body component, and is connected thereto. In every case, this can take place, for example, by way of adhesive bonding, either the matrix which is contained in the fiber composite material or a separate adhesive being used as adhesive.

If the matrix is used for the connection of the reinforcing element to the vehicle body component or the corrosion protection layer, the matrix likewise acts in an adhesive manner on account of its non-cured, that is to say liquid or viscous, state, and establishes a reliable and durable connection to the vehicle body component or the corrosion protection layer after curing (in a manner which is dependent on the respective embodiment). If, in contrast, the adhesive forms a connecting layer between the reinforcing element or the matrix and the vehicle body component or the corrosion protection layer, this arrangement is also to be understood to be a "direct" connection of the elements to be connected despite the connecting layer, within the context of this description.

In every case, an upstream production of a preform is avoided in this way, which preform would otherwise have to be prepared in additional process steps and would subsequently have to be connected to the vehicle body component. In addition, a use of material can be minimized with the aid of the direct laying, by a reinforcing element being applied only where it is required and a size therefore being adapted accordingly without waste.

For example, the reinforcing fibers can be selected from a group comprising glass fibers, carbon fibers, aramid fibers, plastic fibers, metal fibers and/or natural fibers. It goes without saying that the reinforcing fibers can also be used in any desired combinations with one another.

If the vehicle body component is to be subjected to additional painting, the reinforcing element and possibly the corrosion protection layer can thus first of all be cured merely as far as a state, in which they can be painted, and can then be painted. Subsequently, the painted vehicle body component can be subjected to a (further) heat treatment, in order to further cure both the paint and the reinforcing element and possibly the corrosion protection layer jointly.

In the case of curing in an oven, complete curing of the reinforcing element and/or the matrix can take place. Here, a curing temperature in the oven promotes the curing of the matrix and makes a higher glass transition temperature possible than in the case of curing at room temperature, as a result of which mechanical parameters which are once again improved can be achieved.

Furthermore, the reinforcing fibers can be configured as woven fabric, contexture, mesh, knitted fabric, unidirectional tapes, belts or rovings. Accordingly, each reinforcing element herefrom can have one or more layers of the semifinished products which are arranged or stacked above one another.

The step of applying of the reinforcing element can comprise common applying of the matrix and the reinforcing fibers, or separate applying of the matrix and the reinforcing fibers in a number of part steps. The common applying of the matrix and the reinforcing fibers can take place, for example, in the form of preimpregnated reinforcing fibers, in particular as what are known as "prepregs". As an alternative, a separate application can take place by, for example, in a first part step, matrix first of all being applied to the corresponding location, and subsequently one or more layers of dry or likewise preimpregnated reinforcing fibers. Depending on requirements, further matrix can be applied to or between the layers of the reinforcing fibers in further intermediate part steps.

In the two cases, the individual layers can preferably be applied one after another to the vehicle body component in order to produce a multiple-layer construction. Therefore, in a first step, a first layer of the reinforcing element is applied (in a manner which is dependent on the respective embodiment) directly either to the uncoated vehicle body component or otherwise directly to that surface of the vehicle body component which is coated with the corrosion protection layer. In a later step, a second layer of the reinforcing element can be deposited onto the first layer merely in sections or over the full area. Subsequently, if required, further layers can be applied in the same way. The layer by layer construction makes it possible for a thickness of the reinforcing element to be varied in sections, with the result that, if required, the reinforcing element does not have to have a uniform thickness. Thus, in addition, expensive fiber material and component weight can be saved.

For example, the step of applying of the reinforcing element can take place by way of the "Automated Fiber Placement" (AFP for short) method, the "Fiber Patch Placement" (FPP for short) method, the "Automated Tape Laying" (ATL for short) method or by means of hand lay-up.

In accordance with one embodiment, the reinforcing element can be arranged along a force flow path (also called a load path). All indicated forms of the reinforcing element and/or the fiber composite material are fundamentally suitable to this end, but, in particular, unidirectional fiber composite material, that is to say tapes or belts with a unidirectional fiber orientation which are arranged such that they are extended along a force flow path. For example, a fiber orientation can be oriented in a circumferential direction of the opening, that is to say so as to run around the opening along the opening frame.

Moreover, the step of providing of the vehicle body component can comprise fixed connecting of at least two components, in particular integrally joined, non-positive and/or positively locking connecting, preferably by means of adhesive bonding and/or welding. Therefore, the corresponding connection can be reinforced and stiffened in an assisting manner with the aid of the applied reinforcing element, with the result that lower requirements can be made of the fixed connection.

For example, the reinforcing element can be arranged with in each case one section on a respective surface section of the following components of the motor vehicle which surround the respective opening and form the associated opening frame, and therefore connect them to one another in various combinations: an A-pillar, a roof side frame, a B-pillar, a C-pillar and/or a side sill.

In this way, it is possible, if required, for a reinforcement, for example, of a door opening of a vehicle body to be provided, by the reinforcing element being applied on a respective surface of the A-pillar, the roof side frame, the B-pillar and the side sill. In order to reinforce a door opening of a rear door opening, the corresponding reinforcing element is applied, for example, to the respective surfaces of the B-pillar, the roof side frame, the C-pillar and the side sill. It goes without saying that other openings, such as window openings or other door openings, can also be reinforced in this way.

Here, but also fundamentally for all embodiments, the reinforcing element can be configured, for example, from a single element or from a plurality of part elements. For example, the plurality of part elements can be arranged so as to overlap with one another at least in their edge sections, in order for it to be possible for a required size of the overall reinforcing element to be provided.

Nodes, for example between the B-pillar and the roof bow and/or between the B-pillar and the sill, can likewise be reinforced, and a rigidity of the vehicle body can therefore be increased, by in each case one reinforcing element being provided for each connection or a common, continuous reinforcing element being provided for the two connections.

Moreover, at least one of the structural parts of the vehicle body component can be manufactured from a metallic material, in particular steel and/or aluminum, or from a plastic and/or a fiber reinforced plastic. Accordingly, vehicle body components are therefore possible with structural parts which are all manufactured uniformly from one of the materials, or else the components are manufactured from different materials.

Furthermore, a fiber reinforced vehicle body component for a motor vehicle is provided, with at least one opening, in particular a door opening or a window opening, a reinforcing element made from fiber composite material being applied on an opening frame of the opening, which opening frame is formed by the vehicle body component.

The vehicle body component is preferably produced in accordance with the described method.

Here, the reinforcing element can be applied on an uncoated surface section of the vehicle body component. As an alternative, the reinforcing element can be applied on a surface which is coated with the corrosion protection layer.

A considerable rigidity increase can be achieved with the aid of the described method and/or the described vehicle body component. This makes either an increase in the overall rigidity of the vehicle body component or a vehicle body possible with regard to special requirements. Thus, a type of "roll cage" can be provided in a discreet and, in particular, space-saving manner by way of the described method, with the result that a type of "roll cage" in the sense of a "safety cell" can also be realized. This is suitable not only for motor sports applications, but rather, for example, also for vehicle derivatives which require a rigidity adaptation. Accordingly, complex and large constructions in the vehicle interior compartment can be dispensed with. The improved rigidity can likewise also be utilized, however, to save material of the vehicle body component and therefore for an improved lightweight construction.

The invention will be described in greater detail in the following text on the basis of one exemplary embodiment with reference to the drawings.

DETAILED DESCRIPTION OF THE DRAWINGS

Figure 1:
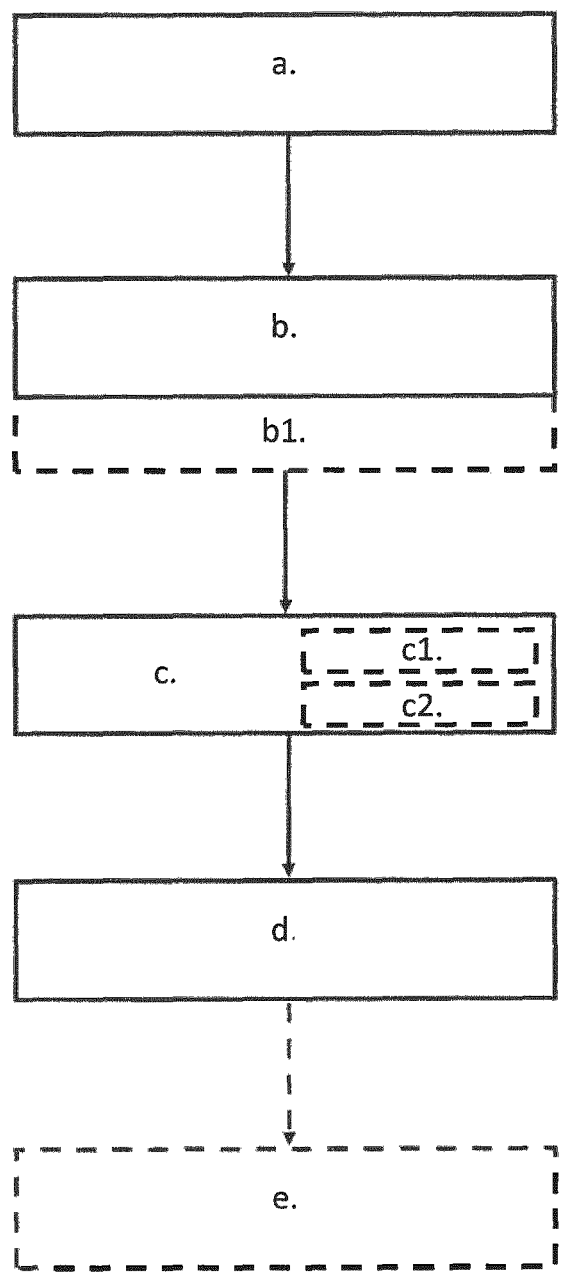
FIG. 1 is a flow chart of a method in accordance with the description.

FIG. 1 shows a flow chart with respect to a method for producing a fiber reinforced vehicle body component for a motor vehicle, the vehicle body component having at least one opening, in particular a door opening or a window opening. In accordance with the embodiment which is shown, the method comprises the following steps:

step a.: providing of the vehicle body component,
step b.: coating of a surface of the vehicle body component with a corrosion protection layer (optional step),
step c.: applying of a reinforcing element made from fiber composite material with reinforcing fibers which are embedded in a matrix, the matrix having a non-cured state, and the reinforcing element being applied on an opening frame of the opening, which opening frame is formed by the (coated) vehicle body component.

Here, step b is to be understood to be merely optional. Step b of coating can likewise be dispensed with at this point, and the reinforcing element can be applied to an uncoated vehicle body component.

In every case, it is possible that the step of applying of the reinforcing element comprises applying of the reinforcing element to the opening frame merely in sections or so as to extend around the opening.

Moreover, the step of applying can comprise applying of the reinforcing element to an inner side of the opening frame, which inner side faces the opening, and/or to an end face of the opening frame, which end face is on the outer side of the vehicle and/or the inner side of the vehicle.

The fiber composite material of the reinforcing element can preferably comprise a fiber/plastic composite with reinforcing fibers which are embedded in a matrix, the reinforcing fibers being selected from a group comprising glass fibers, carbon fibers, aramid fibers, plastic fibers, metal fibers and/or natural fibers. To this end, the reinforcing fibers can be configured as woven fabric, contexture, mesh, knitted fabric, unidirectional tapes, belts or rovings.

The optional step b. of coating can take place, for example, as coating of the surface with a cathodic dip coating (CDC). In accordance with an embodiment which is not shown, instead of before the applying of the reinforcing element, this can take place temporally after the applying.

Furthermore, the optional step b. of coating can comprise an additional intermediate step b1., likewise merely optional in this regard, of at least partial or complete curing of the corrosion protection layer, which step takes place before step c. of the applying of the reinforcing element. If the additional step b1 is not carried out, the following applying of the reinforcing element takes place onto a non-cured corrosion protection layer.

Step c. of the applying of the reinforcing element can preferably comprise direct laying of the reinforcing element onto the corrosion protection layer. If the optional step b. is not provided, the laying can in contrast take place directly onto the uncoated vehicle body component within the context of step c.

At any rate, for example, step c. can comprise either common applying of the matrix and the reinforcing fibers, for example as a prepreg, or separate applying of the matrix and the reinforcing fibers, the separate applying taking place in a number of part steps c1, c2, . . . . For example, in a first part step, a matrix can first of all be applied, and the reinforcing fibers can subsequently be applied to the matrix. Accordingly, further layers of matrix and/or reinforcing fibers can subsequently be applied.

It goes without saying that a plurality of layers can also be applied in part steps c1, c2, . . . which follow one another in the case of the common applying of the matrix and the reinforcing fibers.

For example, step c. of applying of the reinforcing element can take place by way of the "Automated Fiber Placement" (AFP) method, the "Fiber Patch Placement" (FPP) method, the "Automated Tape Laying" (ATL) method or by means of hand lay-up. The reinforcing element can preferably be applied along a force flow path on the vehicle body component In accordance with the embodiment which is shown, a step d. of (common) curing of the reinforcing element and the corrosion protection layer can likewise optionally be provided following step c. If the reinforcing element has been applied to a corrosion protection layer which is not cured or is cured merely partially, common curing is brought about. If, in contrast, the reinforcing element has been applied to a corrosion protection layer which has already been cured, merely the reinforcing element is cured further in step d.

Furthermore, in a following step e., a paint can optionally be applied to the reinforced vehicle body component, and the paint can be dried and/or cured.

Figure 2:
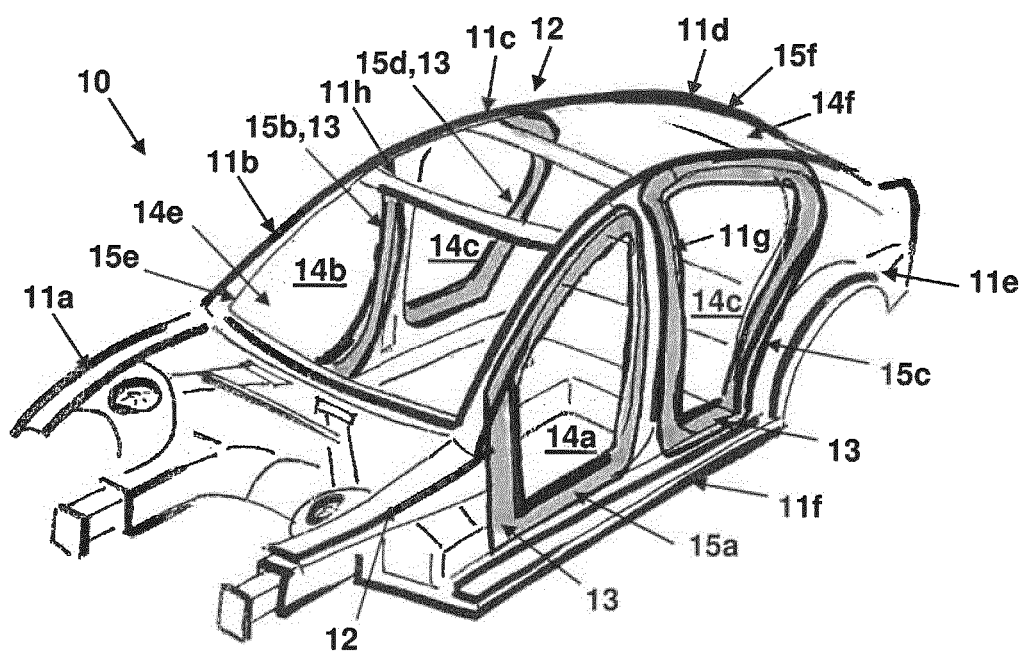
FIG. 2 is a perspective view of a fiber reinforced vehicle body component in accordance with the description.

FIG. 2 shows a first embodiment of a fiber reinforced vehicle body component 10. This can be configured, for example, as part of a vehicle body or else, as shown in FIG. 2, as a vehicle body 10. This comprises a plurality of components 11a-11h which are connected fixedly to one another. A front end car frame 11a and an A-pillar 11b, a roof bow 11h, and a roof side frame 11c which is arranged as an extension to the A-pillar 11b and which merges at its rear end into a C-pillar 11d, are shown as components 11a-11h. The C-pillar 11d is connected to a trunk frame 11e. In addition, the roof side frame 11c is connected to an upper end of a B-pillar 11g which is fastened at a lower end to a side sill 11f.

The vehicle body component 10 has a surface which is optionally coated with a corrosion protection layer. In addition, the fiber reinforced vehicle body component 10 has a plurality of openings 14a-14f in the form of four door openings 14a-d or a plurality of window openings 14e, 14f. A reinforcing element 13 (marked in gray) made from fiber composite material is applied in each case on an opening frame 15a-15d of the respective door opening 14a-14d, which opening frame 15a-15d is formed by the vehicle body component 10. The reinforcing element 13 is applied in each case peripherally on the respective opening frame 15a-15d. In particular, the reinforcing elements 13 are arranged on an inner side of the opening frame 15a-15d, which inner side faces the respective opening. As an alternative or in addition, the respective reinforcing element 13 can be provided on an end face of the opening frame 15a-15d, which end face is on the outer side of the vehicle and/or the inner side of the vehicle.

The respective reinforcing element 13 made from fiber composite material is therefore arranged so as to span across components. Thus, a first reinforcing element 13 is arranged on a surface of the A-pillar 11b, the roof side frame 11c of the B-pillar 11g and the side sill 11f, which surface forms in each case the inner side of the opening frame at least in sections. For the rear door opening, the corresponding reinforcing element 13 is attached on a surface on the B-pillar 11g, the roof side frame 11c, the C-pillar 11d and the side sill 11f, which surface forms in each case the inner side of the opening frame at least in sections.

Therefore, the respective reinforcing element 13 extends peripherally along a complete inner side of the respective door opening 14a-14d, and therefore ensures a particularly advantageous reinforcing and stiffening of the entire vehicle body.

The fiber composite material of the respective reinforcing element 13 comprises a fiber/plastic composite with reinforcing fibers (merely indicated) which are embedded in a matrix, it being possible for the reinforcing fibers to be selected from a group comprising glass fibers, carbon fibers, aramid fibers, plastic fibers, metal fibers and/or natural fibers. For example, the reinforcing fibers of the first reinforcing element 13 can be configured as unidirectional tapes, belts or rovings. As an alternative or in addition, the reinforcing fibers of the first reinforcing element 13 can also, however, be provided as woven fabric, contexture, mesh or knitted fabric.

What is claimed is:

1. A method for producing a fiber reinforced vehicle body component for a motor vehicle, wherein the fiber reinforced body component has a vehicle body component with at least one opening and a reinforcing element, the method comprising the steps of:
   a. providing the vehicle body component;
   b. applying the reinforcing element to an internal periphery of a frame defined by at least one opening formed by the vehicle body component, wherein the reinforcing element comprises fiber composite material with reinforcing fibers embedded in an uncured matrix such that the reinforcing element is shaped from a prepreg shape via the application of the reinforcing element to the frame;
   c. curing the matrix of the reinforcing element applied to the frame such that the reinforcing element stiffens the vehicle body component.

2. The method according to claim 1, wherein the at least one opening is a door or window opening.

3. The method according to claim 1, wherein the step of applying the reinforcing element comprises: applying the reinforcing element to the frame in sections so as to extend around the opening.

4. The method according to claim 1, wherein the step of applying the reinforcing element comprises:
   applying the reinforcing element to:
   (i) an inner side of the frame, which inner side faces the opening, and/or
   (ii) an end face of the frame, which end face is on an outer side and/or inner side of the vehicle.

5. The method according to claim 1, wherein before or after the step of applying the reinforcing element, the method comprises:
   coating a surface of the vehicle body component with a corrosion protection layer.

6. The method according to claim 5, wherein the step of coating is a cathodic dip coating.

7. The method according to claim 5, wherein the step of coating comprises at least partial or complete curing of the corrosion protection layer, which curing takes place before the step of applying the reinforcing element.

8. The method according to claim 5, wherein following the step of applying the reinforcing element, a step of common curing of the corrosion protection layer and of the reinforcing element takes place.

9. The method according to claim 5, wherein the step of applying the reinforcing element comprises: direct laying of the reinforcing element onto the vehicle body component or the corrosion protection layer.

10. The method according to claim 1, wherein the fiber composite material of the reinforcing element comprises a fiber/plastic composite with reinforcing fibers which are embedded in a matrix, the reinforcing fibers being selected from a group comprising: glass fibers, carbon fibers, aramid fibers, plastic fibers, metal fibers and natural fibers.

11. The method according to claim 10, wherein the reinforcing fibers are configured as woven fabric, contexture, mesh, knitted fabric, unidirectional tapes, belts or rovings.

12. The method according to claim 1, wherein the step of applying the reinforcing element comprises: common applying of the matrix and the reinforcing fibers, or separate applying of the matrix and the reinforcing fibers in a number of part steps.

13. The method according to claim 1, wherein the step of applying the reinforcing element takes place by way of an "Automated Fiber Placement" method, a "Fiber Patch Placement" method, an "Automated Tape Laying" method, or by hand lay-up.

14. The method according to claim 1, wherein the reinforcing element is arranged along a force flow path.

15. The method according to claim 1, wherein the vehicle body component is manufactured at least in sections from a metallic material or from a plastic and/or a fiber reinforced plastic.

16. A vehicle, comprising:
   a fiber reinforced vehicle body component with at least one door opening or window opening defining a frame thereof; and
   a reinforcing element made from fiber composite material applied to an internal periphery of the frame, wherein the reinforcing element comprises fiber composite material with reinforcing fibers embedded in an uncured matrix such that the reinforcing element is shaped from a prepreg shape via the application of the reinforcing element to the frame, and such that the reinforcing element stiffens the vehicle body component when cured.

17. The vehicle according to claim 16, wherein the vehicle body component is produced by:
   a. providing the vehicle body component;
   b. applying the reinforcing element to the internal periphery of the frame formed by the vehicle body component so as to shape the reinforcing element from the prepreg shape via the application of the reinforcing element to the frame; and
   c. curing the matrix of the reinforcing element applied to the frame such that the reinforcing element stiffens the vehicle body component.

* * * * *